C. J. HERO.
MASSAGING AND EXERCISING IMPLEMENT.
APPLICATION FILED DEC. 21, 1908.
932,780.
Patented Aug. 31, 1909.
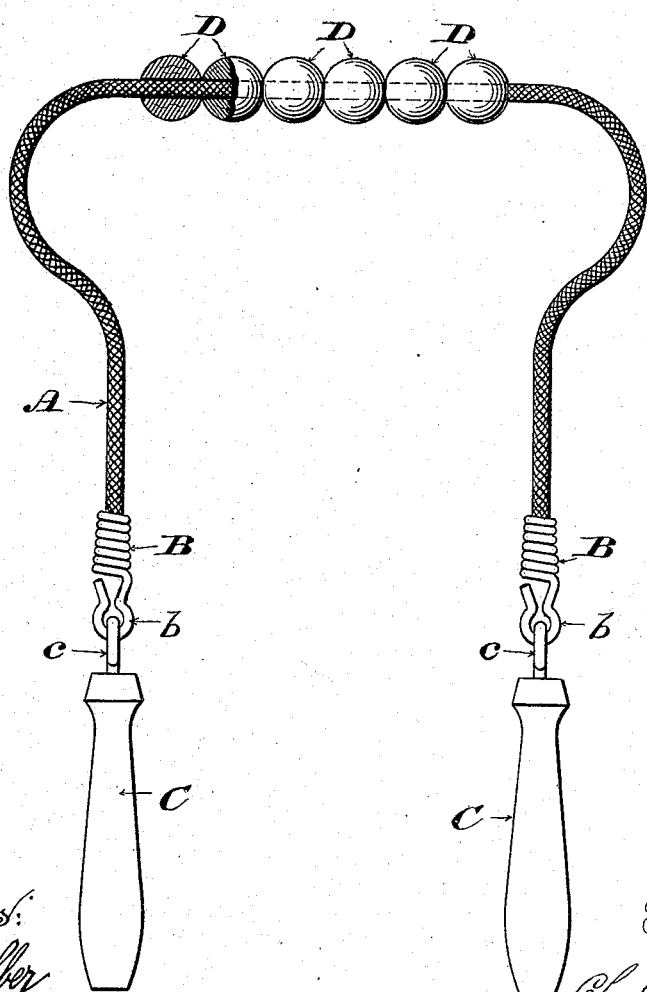

UNITED STATES PATENT OFFICE.

CHARLES J. HERO, OF MILWAUKEE, WISCONSIN, ASSIGNOR TO JOHN F. SAYERS, OF MILWAUKEE, WISCONSIN.

MASSAGING AND EXERCISING IMPLEMENT.

932,780.  Specification of Letters Patent.  Patented Aug. 31, 1909.

Application filed December 21, 1908. Serial No. 468,460.

*To all whom it may concern:*

Be it known that I, CHARLES J. HERO, a citizen of the United States, and resident of Milwaukee, in the county of Milwaukee and State of Wisconsin, have invented certain new and useful Improvements in Massaging and Exercising Implements; and I do hereby declare that the following is a full, clear, and exact description thereof.

My invention consists in what is hereinafter particularly described with reference to the accompanying drawing and pointed out in the claims of this specification, its object being to provide simple, economical and efficient massaging and exercising implements, each of which may be readily manipulated under varying pressure upon any part of the body of the individual employing the same, the movement of spherical rubbing devices of the implement being either rolling or sliding, according to the fancy of the operator, without pinching.

The drawing represents an elevation of a massaging and exercising implement in accordance with my invention partly in section.

Referring by letter to the drawing, A indicates an elastic cord confined at its ends in conical ferrules B of spirally wound wire and having hook-terminals *b* with which eyes *c* of handles C are engaged.

Strung on the cord, midway of its length, are a series of spherical devices D, each having the diameter of its axial stringing aperture less than the normal diameter of said cord, whereby provision is had for its friction-grip upon the same.

The implement is grasped by its handles in both hands of the operator and its spherical devices put in contact with the portion of the body to be treated. Now by alternately stretching and releasing of the elastic cord of said implement, a reciprocative rolling motion under variable pressure is imparted to the spherical devices on said cord to effect the massage, or the implement may be longitudinally reciprocated, in which case a sliding motion is imparted to said spherical devices for the purpose stated. It also follows that the implement may be utilized as an exerciser without contact of the spherical devices thereof with the body of the operator.

I claim:

1. A massaging and exercising implement comprising an elastic cord, and a series of spherical devices strung on the cord in friction-grip with the same.

2. A massaging and exercising implement comprising an elastic cord provided with handles, and a series of spherical devices strung on the cord in friction-grip with the same.

3. A massaging and exercising device comprising an elastic cord, conical ferrules of spirally wound wire in which the ends of the cord are gripped, handles having eyes engaging hook-terminals of the ferrules, and a series of spherical devices strung on said cord in friction-grip with the same midway of its ends.

In testimony that I claim the foregoing I have hereunto set my hand at Milwaukee, in the county of Milwaukee and State of Wisconsin in the presence of two witnesses.

CHARLES J. HERO.

Witnesses:
 GEO. W. YOUNG,
 GEORGE G. FELBER.